(12) United States Patent
Vesanen et al.

(10) Patent No.: US 11,499,297 B2
(45) Date of Patent: Nov. 15, 2022

(54) MEASURING ARRANGEMENT FOR MEASURING THREE DIMENSIONAL LOCATION AND ORIENTATION OF THE CENTER AXIS OF FIRST AXLE IN RELATION TO THE CENTER AXIS OF SECOND AXLE

(71) Applicant: Novatron Oy, Pirkkala (FI)

(72) Inventors: Mikko Vesanen, Pirkkala (FI); Tuomas Kovanen, Pirkkala (FI)

(73) Assignee: Novatron Oy, Pirkkala (FI)

( * ) Notice: Subject to any disclaimer, the term of this patent is extended or adjusted under 35 U.S.C. 154(b) by 377 days.

(21) Appl. No.: 16/798,484

(22) Filed: Feb. 24, 2020

(65) Prior Publication Data

US 2020/0340214 A1    Oct. 29, 2020

(30) Foreign Application Priority Data

Apr. 25, 2019  (FI) ..................................... 20195333

(51) Int. Cl.
*E02F 9/26* (2006.01)
(52) U.S. Cl.
CPC .............. *E02F 9/265* (2013.01); *E02F 9/262* (2013.01)
(58) Field of Classification Search
CPC ... E02F 3/844; E02F 9/20; E02F 9/262; E02F 9/264; E02F 9/265; G01S 17/88
See application file for complete search history.

(56) References Cited

U.S. PATENT DOCUMENTS

| | | | | |
|---|---|---|---|---|
| 8,838,329 B2* | 9/2014 | Seki | ........................ | G01C 15/00 |
| | | | | 701/33.1 |
| 9,644,346 B2* | 5/2017 | Seki | ........................ | E02F 3/435 |
| 10,422,111 B2* | 9/2019 | Yamada | .................. | E02F 9/265 |

(Continued)

FOREIGN PATENT DOCUMENTS

DE  11 2017 000076 T5   4/2019
EP       2 570 769 A1   3/2013

(Continued)

OTHER PUBLICATIONS

Extended European search report received for European Patent application No. 20158959.5 dated Jul. 17, 2020, 9 pages.

(Continued)

*Primary Examiner* — Tyler J Lee
(74) *Attorney, Agent, or Firm* — FisherBroyles, LLP

(57) ABSTRACT

A measuring arrangement includes a positioning arrangement including at least one locator, at least one first spot to be located, at least one second spot to be located, and a position data gathering unit for gathering a first set of at least three different position data measurements of each of the at least one first spot to be located, wherein the different position data measurements are taken in different rotation angles around a first axle, and a second set of at least three different position data measurements of each of the at least one second spot to be located, wherein the different position data measurements are taken in different rotation angles around a second axle. The three dimensional location and orientation of the center axis of the first axle with respect to the center axis of the second axle are determined on the basis of the first and second set of position data measurements.

20 Claims, 4 Drawing Sheets

(56) References Cited

U.S. PATENT DOCUMENTS

| | | | | |
|---|---|---|---|---|
| 2013/0158785 A1* | 6/2013 | Fukano | ............. | E02F 9/261 |
| | | | | 701/34.4 |
| 2013/0158789 A1* | 6/2013 | Seki | ............. | G01S 19/45 |
| | | | | 701/34.4 |
| 2013/0158797 A1* | 6/2013 | Fukano | ............. | E02F 9/264 |
| | | | | 701/36 |
| 2014/0180579 A1 | 6/2014 | Friend et al. | | |
| 2015/0330060 A1* | 11/2015 | Seki | ............. | G01S 19/14 |
| | | | | 701/33.1 |
| 2016/0187467 A1 | 6/2016 | Sato et al. | | |
| 2018/0167588 A1 | 6/2018 | Izumikawa et al. | | |
| 2019/0024344 A1 | 1/2019 | Okui et al. | | |

FOREIGN PATENT DOCUMENTS

| | | |
|---|---|---|
| EP | 2 641 661 A1 | 9/2013 |
| WO | 2018/099755 A1 | 6/2018 |

OTHER PUBLICATIONS

Finnish Search Report received for Finnish Patent Application Serial No. 20195333 dated Aug. 22, 2019, 2 pages.

Vahdatikhaki et al., "Optimization-Based Excavator Pose Estimation Using Real-Time Location Systems", Journal of Automation in Construction, vol. 56, Apr. 30, 2015, pp. 76-92.

Soltani et al., "Skeleton Estimation of Excavator by Detecting its Parts", Journal of Automation in Construction, vol. 82, Jul. 23, 2017, pp. 1-15.

* cited by examiner

MEASURING ARRANGEMENT FOR MEASURING THREE DIMENSIONAL LOCATION AND ORIENTATION OF THE CENTER AXIS OF FIRST AXLE IN RELATION TO THE CENTER AXIS OF SECOND AXLE

CROSS-REFERENCE TO RELATED APPLICATION

This application claims benefit and priority to Finnish Application No. 20195333, filed Apr. 25, 2020, which is incorporated by reference herein in its entirety.

BACKGROUND

Field

The present invention relates to a measuring arrangement relating, for example, to earthworks machines or lifting machines, which measuring arrangement may, for example, be utilized in an individual calibration of each machine.

SUMMARY

Different types of work machines may be utilized at different earthmoving work sites or construction sites for example for moving soil or rock material to another location or to lift materials to be used in the constructions. Examples of this kind of work sites include for example substructure construction work sites or housing construction work sites for buildings and road construction work sites. The work machines like that are for example excavators and mobile cranes.

The work machines and the tools of the work machines should be able to be positioned very accurately on the work site in order to execute designed operations. The information regarding the accurate location of the work machine and the tool of the work machine may be shown to an operator of the work machine so that the operator may use the information while controlling the tool and the machine. This accurate location information of the machine and the tool of the machine is especially important when it is utilized into semiautomatic or fully automatic work machines, i.e. work machines operating at least some time without a constant control by the operator of the machine, whereby possible misplacement of the machine or its working tool is not immediately rectified by the operator of the machine. Automatic positioning of the machine may be based for example on a satellite-based positioning system GNSS (Global Navigation Satellite Systems), such as GPS (US), GLONASS (RU), Galileo (EU) or Compass (CN). Alternatively the positioning of the work machine may be provided by means of a total station, or the like, arranged to the machine or to the work site close to the machine.

A problem relating to the automatic positioning of the work machine and its working tool is, however, variations in the measures or dimensions of the work machines. This means that although parts, components and actuators providing the complete work machine are in principle same in every similar machine, tolerances, for example, in welding or even small differences in the manufacturing, operation and assembly of the parts, components and actuators and thereby in the complete work machine itself cause variations in the actual measures or dimensions of the similar machines. These variations, in turn, may cause inaccuracies in the automatic positioning of the work machine and its working tool. For example, as regards to excavators wherein there is an upper carriage rotatable relative to a lower carriage, it is very difficult to take into account for example in a positioning of a tip of a bucket a position of a rotation axis of the upper carriage relative to a boom pin that fastens a boom of the excavator to the upper carriage of the excavator. In the excavators like that difficulties arise from the variations in the position and orientation between the rotation axis of the upper carriage and the boom pin. In practice this means that although the measures of a completely new excavator are known theoretically, only a small deviation for example in the orientation of the boom pin causes gratuitous error in the positioning of the tip of the bucket, especially in applications wherein a target accuracy in the positioning of the tip of the bucket should be for example less than 20 mm. In used excavators these variations may be even larger due to wear of the parts, components and actuators of the excavator.

Further problem relating to the automatic positioning of the work machine and its work tool concerns cases where the system using automatic positioning of the machine is retrofitted to an older work machine. For retrofitting, the information of the manufacturer's specified machine dimensions may not be available for installers.

Still further problem relating to defining the dimensions of, for example, an individual excavator regarding the rotating axis in relation to each other arises when the rotating axles are not visible.

An object of the present invention is to provide a novel measuring arrangement which may for example be utilized in an individual calibration of a work machine.

The invention is characterized by the features of the independent claims.

The invention is based on the idea of determining in a work machine a three dimensional location and orientation of a second axle in respect of a first axle. According to an idea of the solution at least one first spot and at least one second spot to be located are selected in the work machine. Thereafter it is gathered a first set of at least three different position data measurements of each of the at least one first spot to be located, the different position data measurements of the first set taken in different rotation angles around a first axle; and further it is gathered a second set of at least three different position data measurements of each of the at least one second spot to be located, the different position data measurements of the second set taken in different rotation angles around a second axle. Thereafter it is determined the three dimensional location and orientation of the centre axis of the first axle with respect to the centre axis of the second axle.

In the specification and claims below the term "axle" refers generally to a real or an actual physical axle or shaft in the work machine or a structure like the structure connecting a lower carriage of an excavator to a rotating upper carriage of the excavator that may be pictured to rotate around a fictitious axle and the term "axis" refers to a fictitious axis having theoretically an infinite length and zero thickness and representing for example a rotation axis of an axle of the work machine or an axis of a coordinate system utilized in the solution disclosed herein.

The advantage of the invention is that the variation in the dimensions between work machines relating to the location and orientation of a first axle in respect of a second axle may be determined and compensated in an automatic control of the positioning of the working tool of the work machine. In excavators, for example, it may be eliminated the effect of any variation in the measure between a rotation axis of the upper carriage of the excavator and a rotation axis of a boom of the excavator, and thereby to calibrate the control of the excavator for enabling the positioning of the bucket of the excavator more accurately.

Some embodiments of the invention are disclosed in the dependent claims.

According to an embodiment of the measuring arrangement, the at least one first spot is the same as the at least one second spot.

According to an embodiment of the measuring arrangement, the positioning arrangement comprises at least two first spots to be located, wherein at least one of the at least two first spots reside in essentially different radius from an estimated location of the first axle than at least one other of the at least two first spots.

According to an embodiment of the measuring arrangement, the positioning arrangement comprises at least two second spots to be located, wherein at least one of the at least two second spots reside in essentially different radius from an estimated location of the second axle than at least one other of the at least two second spots.

According to an embodiment of the measuring arrangement, the position data gathering unit is further configured to gather the inclination angle data regarding each of the position data measurements; and the processing unit is further configured to receive as an input the inclination angle data regarding each of the position data measurements.

According to an embodiment of the measuring arrangement, the first axle is a rotation axle of a rotating upper carriage of an earthworks machine and the second axle is a boom pin of the earthworks machine wherein the boom pin is the pin attaching a boom to the rotating upper carriage.

According to an embodiment of the measuring arrangement, at least one first spot is an attachment point for an antenna of any positioning system.

According to an embodiment of the measuring arrangement, the at least one first spot to be located resides in the rotating upper carriage and the at least one second spot to be located resides in the boom, the positioning arrangement further includes at least three fourth spots in a lower carriage of the earthworks machine, wherein the position data gathering unit is further configured to gather, in the first set of at least three different position data measurements of each of the at least one first spot to be located, the position data measurements of the at least three fourth spots in respective different rotation angles as the at least one first spot, and the processing unit is further configured to receive as an input the position data measurements of the at least three fourth spots in respective different rotation angles as the position data measurements of the at least one first spot.

According to an embodiment of the measuring arrangement, the at least one second spot to be located resides in the boom and the rotating upper carriage comprises at least three third spots, and wherein the position data gathering unit is further configured to gather, in the second set of at least three different position data measurements of each of the at least one second spot to be located, the position data measurements of the at least three third spots in respective different rotation angles as the position data measurements of the at least one second spot, and the processing unit is further configured to receive as an input the position data measurements of the at least three third spots in respective different rotation angles as the position data measurements of the at least one second spot.

According to an embodiment of the measuring arrangement, at least one of at least one first spot and at least one third spot is an attachment point for an antenna of any positioning system.

According to an embodiment of the measuring arrangement, the measuring arrangement is further configured to determine at least one 3D-point of the earthworks machine in three dimensions with respect to a determined point in the second axle, wherein the position data gathering unit is further configured to gather a third set of at least one position data measurement of at least one 3D-point to be located with respect to at least one of at least one set of the position data measurements and the information rendered from the at least one set of the position data measurements.

According to an embodiment of the measuring arrangement the at least one 3D-point is an attachment point for at least one of: an antenna of any positioning system and a positioning apparatus residing on a machine, such as a stereo camera arrangement or a total station or the like.

According to an embodiment of the measuring arrangement the at least one 3D-point is any point of interest and, for example, three such determined 3D-points may be used to determine position and orientation of any apparatus at least one of installed and attached in relation to, for example, at least one of first set of position data measurements, second set of position data measurements and information derived from at least one of the previous.

According to an embodiment of the measuring arrangement, when selecting an axial centre point of a boom pin of an earthworks machine as a point of interest, the location of the axial centre point of the boom pin may be determined in the x-y-plane in coordinate system where the rotating axis of the upper carriage is selected as a z-axis and the y-axis is selected to be perpendicular to both the z-axis and the boom pin and the x-axis is selected to be perpendicular to the z-axis and the y-axis.

According to an embodiment of the measuring arrangement the at least one first spot and the at least one second spot are at least one of: tags, prisms and antennas to be located by at least one of the at least one locator, wherein the at least one locator is at least one of: at least one stereo camera arrangement, at least one tachymeter, at least one theodolite, at least one of laser scanning device, a satellite-based positioning system GNSS and any network where location based services using triangulation is possible.

According to an embodiment of the measuring arrangement the at least three fourth spots are at least one of: tags and prisms to be located by at least one of the at least one locator, wherein the at least one locator is at least one of: at least one tachymeter, at least one theodolite, at least one laser scanning device and at least one stereo camera arrangement.

According to an embodiment of the measuring arrangement the at least three third spots are at least one of: tags and prisms to be located by at least one of the at least one locator, wherein the at least one locator is at least one of: at least one tachymeter, at least one theodolite, at least one laser scanning device and at least one stereo camera arrangement.

According to an embodiment of the measuring arrangement at least one of the at least one stereo camera arrangement comprises at least two cameras in locations and orientations known with respect to each other.

According to an embodiment of the measuring arrangement at least one of the at least one stereo camera arrangement is a standalone stereo camera arrangement comprising two cameras in locations and orientations known with respect to each other.

BRIEF DESCRIPTION OF THE DRAWINGS

In the following the invention will be described in greater detail by means of preferred embodiments with reference to the accompanying drawings, in which.

For the sake of clarity, the figures show some embodiments of the invention in a simplified manner. Like reference numerals identify like elements in the Figures.

DETAILED DESCRIPTION

Figure 1:
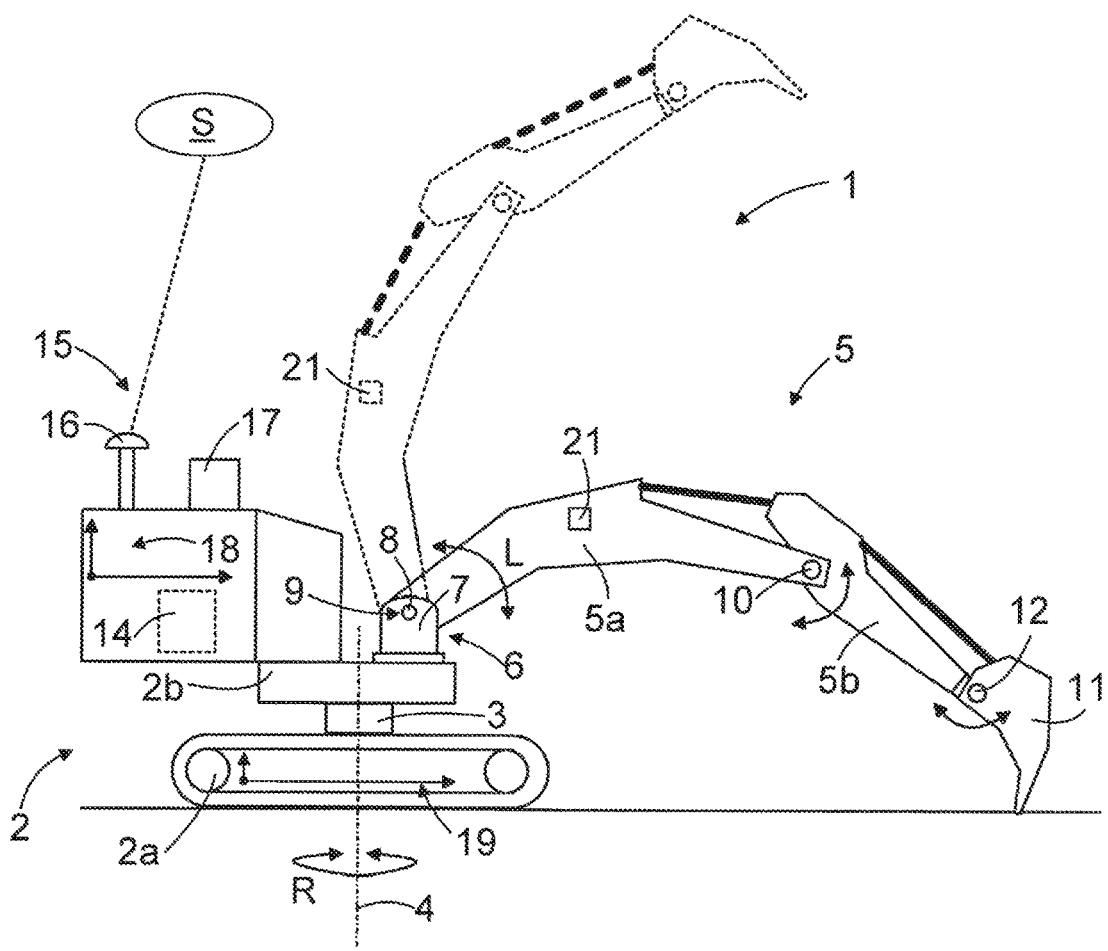
FIG. 1 shows schematically a side view of an excavator.
Figure 2:
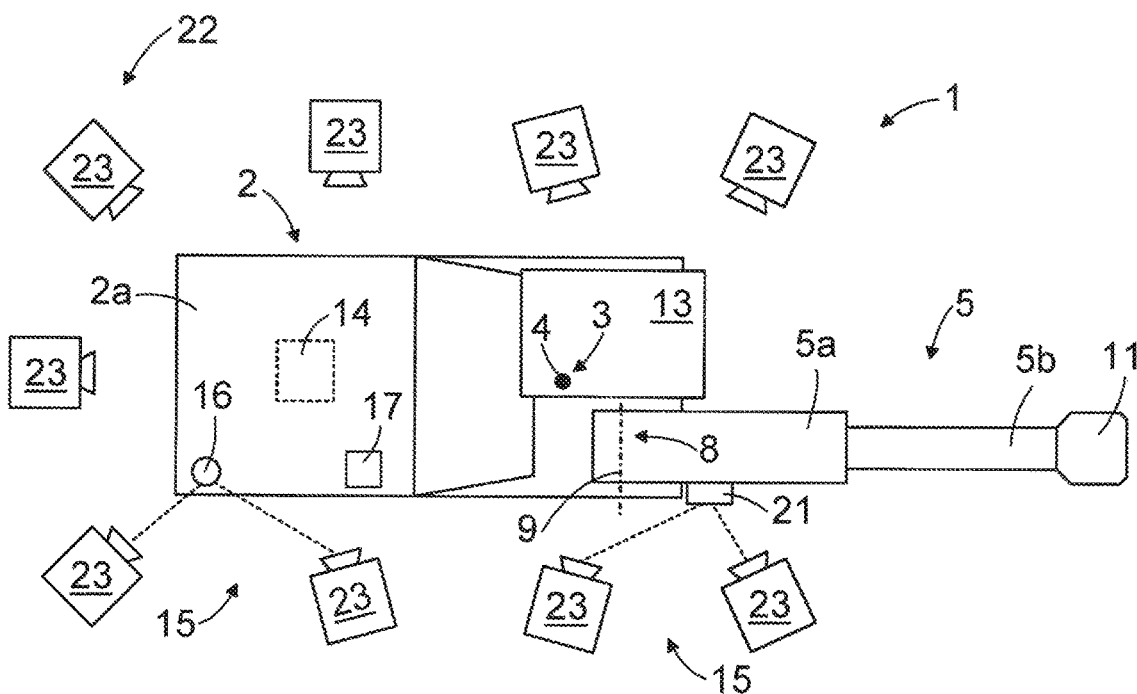
FIG. 2 shows schematically an upper view of the excavator of FIG. 1.

FIG. 1 shows schematically a side view of an excavator 1 and FIG. 2 shows schematically an upper view of the excavator of FIG. 1.

The excavator 1 comprises a movable carriage 2 comprising an under carriage 2a, i.e. a lower carriage 2a, and an upper carriage 2b. The lower carriage 2a comprises caterpillar bands but could alternatively be provided with wheels. The upper carriage 2b is connected to the lower carriage 2a by means of a rotation axle 3 of the upper carriage 2b. The upper carriage 2b may be rotated relative to the lower carriage 2a around a rotation axis 4 as shown schematically with an arrow R. The rotation axis 4 coincides to a centre axis of the rotation axle 3.

The excavator 1 further comprises a boom 5 connected at the upper carriage 2b, whereby the boom 5 is arranged to turn together with the upper carriage 2b. The boom 2 may comprise at least a first boom part 5a. The boom 5 may comprise further boom parts, such as a second boom part 5b. The first boom part 5a is connected to the upper carriage 2b by means of a first joint 6 comprising a base 7 and a boom pin 8. The boom 5 may be lifted and lowered relative to the upper carriage 2b around a lifting axis 9 as shown schematically with an arrow L. The lifting axis 9 coincides to a centre axis of the boom pin 8 and provides a rotation axis 9 for the boom 5, relative to which rotation axis 9 the boom 5 is about to rotate.

The second boom part 5b may be connected to the first boom part 5a by means of a second joint 10. At a distal end of the second boom part 5b there is a working tool, in this case a bucket 11, and between the bucket 11 and the second boom part 5b there may be a third joint 12. In connection with the third joint 12 there may also be joints or mechanisms allowing the bucked to be tilted in a sideward direction, for example.

On the carriage 2 there may be a control cabin 13 for an operator of the machine. For the sake of clarity the control cabin 13 is omitted in FIG. 1. The control cabin 13 may, for example, be provided with a moving arrangement allowing a vertical position of the control cabin 13 to be adjusted relative to the carriage 2.

The excavator 1 further comprises at least one control unit 14 which is configured to control, in response to received control actions, operations of the excavator 1, such as operations of the carriage 2, the boom 5 and the bucket 11.

The excavator 1 may also be provided with a positioning system 15. The positioning system 15 may for example be a satellite-based positioning system GNSS (Global Navigation Satellite Systems) comprising one or more satellite receiving devices, such as antennas 16, for receiving satellite based position data from a number of satellites S. The receiving device may for example be placed on the upper carriage 2b and the control unit 14 may calculate the actual position of the excavator 1 on the basis of the received satellite based position data. In addition to or alternatively to the satellite-based positioning system GNSS, the positioning system 15 may comprise an onboard position measuring device, such as a total station 17.

As said above, the problem relating to the automatic positioning of the earthworks machine and its tool, such as the excavator 1 and especially the bucket 11 thereof, is the variation of the measures or dimensions of the earthworks machines, or of a construction machine like a mobile crane. The measuring arrangement disclosed next is intended to eliminate the effect of any variation in the measure between the rotation axis 4 of the upper carriage 2b and the rotation axis 9 of the boom 5, and in that sense to calibrate the control of the excavator 1. For new machines the measuring arrangement and procedure may be implemented for example at an end of a production line, before a delivery of the machine. For used machines, but as well for the new machines, the measuring procedure may be implemented at a work site for example before introducing the machine at the work site. Alternatively the measuring arrangement and procedure may be implemented at any suitable time during an endurance of the work site. The end of the production line or the work site may thus provide a measurement site for the measuring arrangement and procedure.

The measuring arrangement and procedure utilizes or determines a fictitious or an exemplary coordinate system defined relative to the rotation axis 4 of the upper carriage 2b. The coordinate system is shown schematically in FIGS. 3a to 3c, wherein the upper carriage 2b is shown very schematically from above at various angles of rotation relative to the rotation axis 4. The coordinate system of FIGS. 3a, 3b, 3c comprises a vertically directed z-axis, indicated with the reference sign z. The z-axis coincides with the rotation axis 4 of the upper carriage 2b of the excavator 1, the rotation axis 4 provided by the centre of the rotation axle 3 of the upper carriage 2b. The coordinate system further comprises an x-axis, indicated with the reference sign x. The x-axis is a horizontally directed axis that is perpendicular to the z-axis and determined to be parallel to the lifting axis 9 provided by the boom pin 8 when viewed from above direction. A longitudinal direction centre point of the boom pin 8 is denoted with the reference sign 20. The coordinate system further comprises a y-axis, indicated with the reference sign y. The y-axis is a horizontally directed axis that is perpendicular both to the z-axis and the x-axis.

Figure 4:
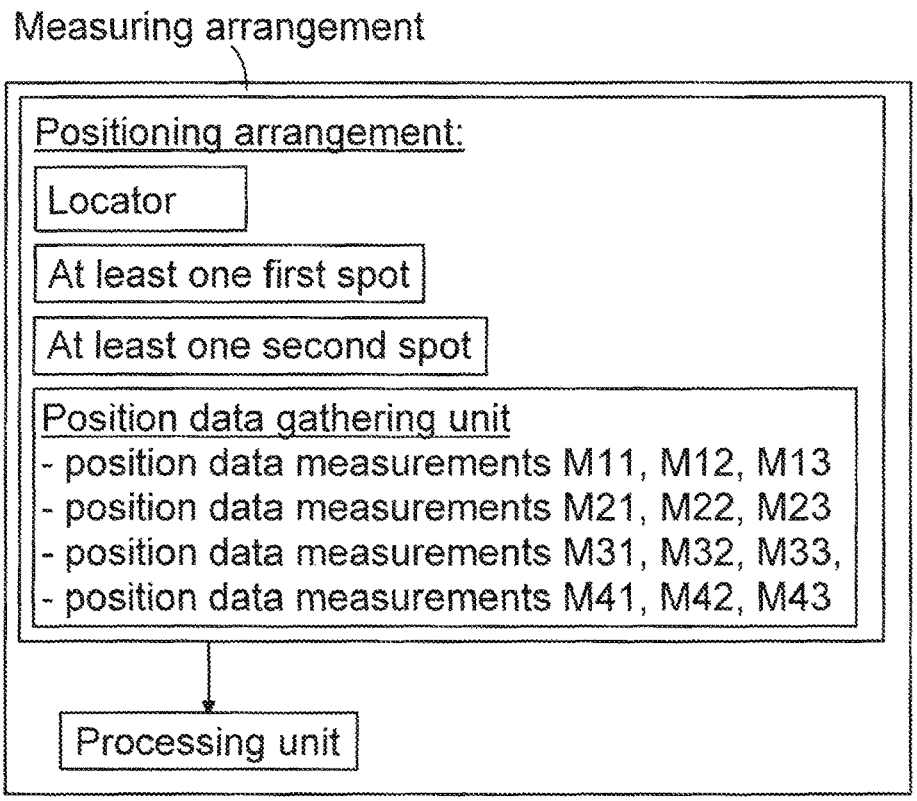
FIG. 4 shows schematically some components of a measuring arrangement.

FIG. 4 shows schematically some components of a measuring arrangement. The measuring arrangement comprises a positioning arrangement by means of which the location of different parts of the excavator 1 in relation to each other may be determined at the measurement site. The positioning arrangement comprises at least one locator which is intended to determine these locations. The locator may for example be the positioning system 15 comprising the satellite-based positioning system GNSS comprising one or more satellite receiving devices, such as antennas 16. Alternatively the locator may be the positioning system 15 comprising at least two cameras 23. Alternatively, the locator may be an access point or base station, such as eNodeB of 3G mobile network of any network where location based services using triangulation or any other suitable method thereof is possible. Thus, antenna 16 may be an antenna for transmitting and receiving data to and from the locator of any network selected. It should be noted that the locator, and the whole positioning arrangement, may be different in the measurement arrangement compared with the positioning system positioning the work machine and the tool of the work machine at work.

The locator may also be or comprise at least one tachymeter, at least one theodolite or at least one laser scanning device.

The positioning arrangement further comprises at least one first spot to be located. The positioning arrangement thus comprises one first spot or two or more first spots to be located. The feature the first spot refers to a specific point in the machine which can be preferably individually identified in the machine. The at least one first spot may thus be one or more selected points at the carriage 2 of the excavator 1 the position(s) of which is/are to be determined during the carrying out of the measuring procedure. The at least one first spot may for example be a head of the antenna 16 or an attachment point of the antenna 16, a head or an attachment point of the total station 17 or some other selected or randomly selected spot in the upper carriage 2b. Alternatively a tag, a prism, or any other detectable item suitable to be fixed at a specific point in the excavator 1, or any specific point in the excavator 1 detectable by the one or more locators used in each measuring arrangement may be used to identify a spot to be located.

The positioning arrangement further comprises at least one second spot to be located. The positioning arrangement thus comprises one second spot or two or more second spots to be located. The feature the second spot refers to a specific point in the machine which can be preferably individually identified in the machine. The at least one second spot may thus be one or more selected points at the boom 5 of the excavator 1 the position(s) of which is/are to be determined during the carrying out of the measuring procedure. The at least one second spot may for example be a tag 21 or an antenna 16 fixed at a specific point in the first boom part 5a of the boom 5. The number of the tags 21 may be higher than only one.

Figure 5A:
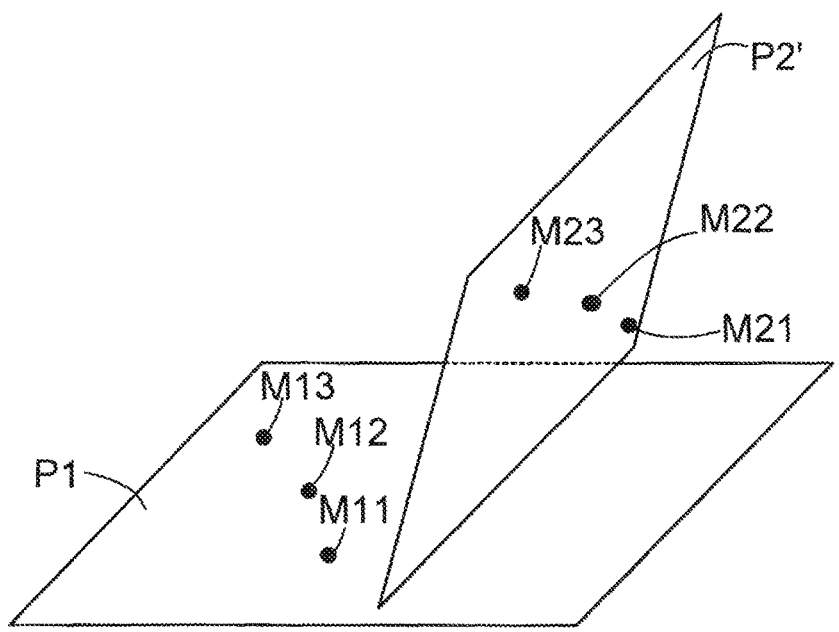
FIGS. 5a to 5c disclose schematically a procedure for determining a three dimensional location and orientation of a second axle in respect of a first axle.
Figure 5B:
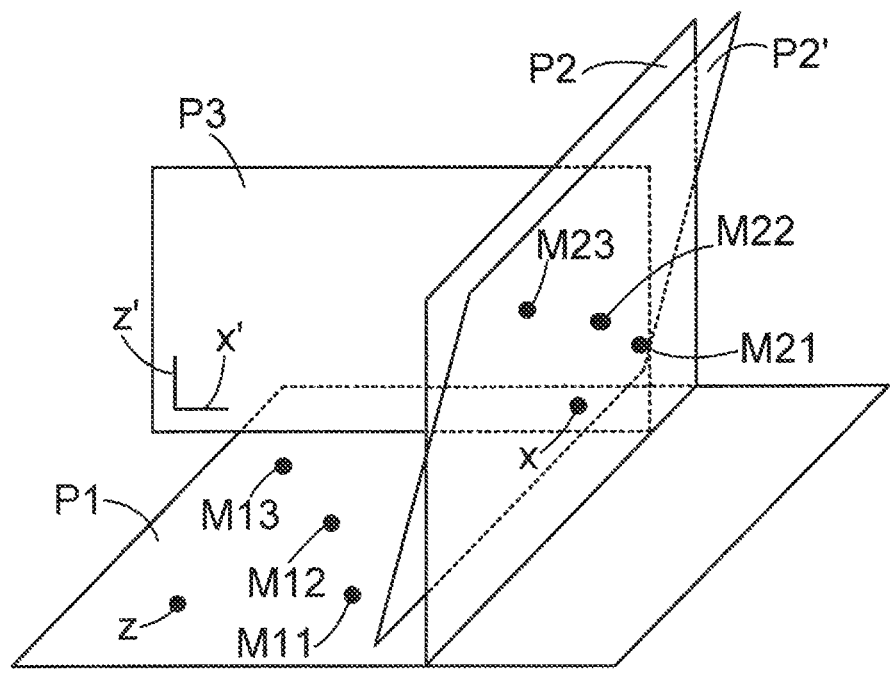
Figure 5C:
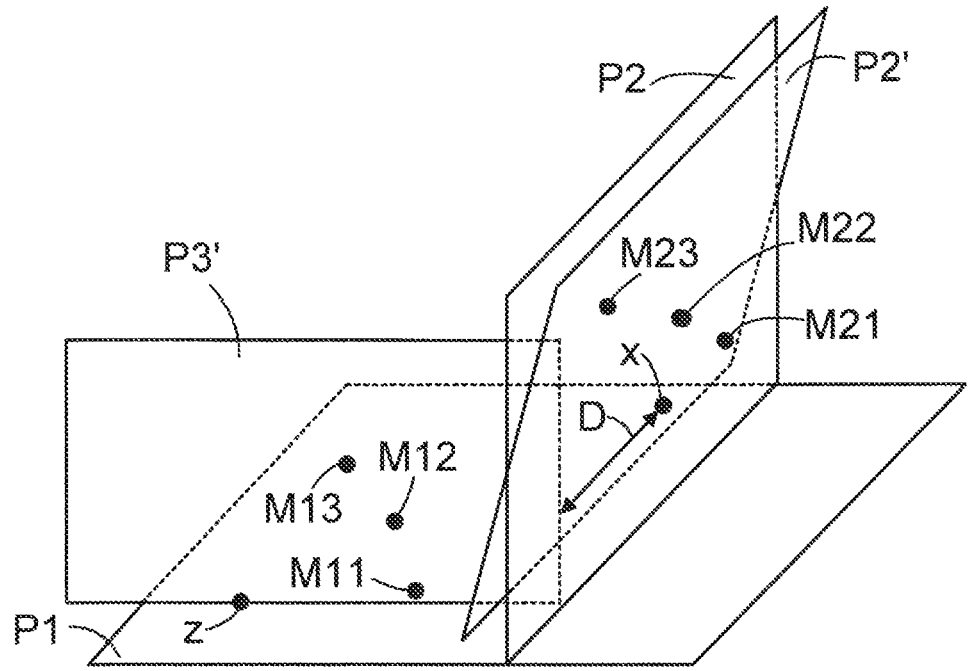

The positioning arrangement further comprises a position data gathering unit for gathering a first set of at least three different position data measurements of each of the at least one first spot to be located, the different position data measurements taken in different rotation angles around a first axle. In the example of FIGS. 5a to 5c disclosed later, the first axle refers to the rotation axle 3 of the upper carriage 2b, whereby the first set of the at least three different position data measurements comprises the determined positions of the at least one first spot in a 3D-space in the different rotation angles of the upper carriage 2b around the rotation axis 4, as shown schematically in FIGS. 3a to 3c, wherein the upper carriage 2b is rotated counter clockwise. According to an embodiment, if the head of the antenna 16 is selected to be at least one first spot, the first set of the position data measurements of the at least one first spot to be located may thus comprise at least three different positions of the head of the antenna 16 at different rotation angles of the upper carriage 2b around the rotation axis 4 thereof. As said above, alternatively to the antenna 16, the at least one first spot may be determined by at least one tag 21 arranged to the upper carriage 2b to specify at least one particular point in the upper carriage 2b. The positioning arrangement further comprises a position data gathering unit, which may be the same position data gathering unit as above, for gathering a second set of at least three different position data measurements of each of the at least one second spot to be located, the different position data measurements taken in different rotation angles around a second axle. In the example of FIGS. 5a to 5c disclosed later, the second axle refers to the boom pin 8 of the boom 5, whereby the second set of the at least three different position data measurements comprises the determined positions of the at least one second spot in a 3D-space in the different rotation angles of the boom 5 around the rotation axis 9. According to an embodiment, if the tag 21 arranged to the first boom part 5a in FIG. 1 is selected to be the at least second spot, the second set of the position data measurements of the at least one second spot to be located may thus comprise at least three different positions of the tag 21 at different rotation angles of the boom 5 around the rotation axis 9 thereof. The different angles of rotation of the boom 5 may refer to the orientations of the boom 5 disclosed in FIG. 1 with continuous lines and broken lines and an intermediate orientation therebetween. Each different position data measurement in the second set of the at least three different position data measurements of each of the at least one second spot to be located is carried out at a single unchanged rotation angle of the upper carriage 2b, for example at the rotation angle of the upper carriage 2b disclosed in FIG. 3a.

The position data gathering unit referred above may for example be connected to a stereo camera arrangement 22 via a data communication connection, either wireless or wired, and may reside in the control unit 14. The stereo camera arrangement 22 comprises at least two cameras 23 that are able to determine a 3D position of the tags to be monitored by triangulation when the location and orientation of the at least two cameras 23 in relation to each other are known. The stereo camera arrangement 22 comprising a number of cameras 23 are schematically disclosed in FIG. 2.

The measuring arrangement further comprises a processing or calculation unit for receiving as an input the first set of position data measurements and the second set of position data measurements, and for determining, based on that received input, the three dimensional location and orientation of the centre axis of the first axle with respect to the centre axis of the second axle. For the sake of clarity, determining and/or defining and/or calculating a three dimensional location and orientation of the centre axis of the first axle with respect to the centre axis of the second axle in this description means the determining and/or defining and/or calculating of both the three dimensional displacement in coordinate system used from known point of the centre axis of the first axle to known point of the centre axis of the second axle and the needed three angles, such as roll, pitch and yaw, to accurately determine in which position the centre axis of the first axle is in relation to the centre axis of the second axle. Thus, when a location of at least one point and/or spot of a machine and/or an apparatus fixedly connected to rotate around the first axle, which point and/or spot is known in its coordinate system, is or may be determined and a rotation angle of the part of the machine and/or the apparatus fixedly connected to rotate around the second axle is or may be determined, a location of at least one point and/or spot of the machine and/or the apparatus residing in known location of the part of the machine and/or apparatus fixedly connected to rotate around the second axle may be fixed and/or placed and/or set and/or positioned accurately in the same coordinate system. Referring to the example disclosed in FIGS. 1, 2 and 3*a* to 3*c* above and in FIGS. 5*a* to 5*c* later, the processing unit may for example be the control unit 14, or reside in the control unit 14, of the excavator 1, whereby the control unit 14 is configured to receive the position data referring to the head of the antenna 16 and the tag 21, and on the basis thereof, to determine the three dimensional location and orientation of the centre axis of the first axle, i.e. the rotation axis 4 of the rotation axle 3 of the upper carriage 2*b*, with respect to the centre axis of the second axle, i.e. the lifting axis 9 or the rotation axis 9 of the boom pin 8. Alternatively, one or more of the position data gathering unit, the processing or calculating unit and the control unit may be external to the excavator 1.

According to an embodiment the tag 21 may be a glittering light source, whereby different tags 21 may be light sources glittering with different frequencies. In that case each light source with different glittering frequency can be individually identified in the view of the stereo camera arrangement 22, if the position of the specific tag 21 in the excavator 1 is not specifically pointed or taught to the stereo camera arrangement 22.

According to an embodiment the tag 21 may be a reflector ball. Each camera 23 determines the direction to each of the reflector balls it discovers or sees, and by using triangulation are the coordinates of these tags 21 in the coordinate system of the stereo camera arrangement 22 determined. Camera 23 may contain an IR light source to more easily detect the reflector ball. If the reflector ball is used as the tag 21, two or more cameras 23 may determine the direction to the centre of the reflector ball, whereby by triangulation the coordinates or the position of the tag 21 implemented as the reflector ball may be determined, and thereby the coordinates or the position of the specific spot in the excavator 1 may be reliably determined with two or more cameras 23.

According to an embodiment each tag 21 may be a combination of one or more light sources and one or more reflector balls.

According to an embodiment each tag 21 may be an aruco marker or a QR-code the positions of the one or more corners of which, for example, are to be determined. Alternatively, the position of any one spot of the aruco marker or the QR-code is to be determined, or the position of any one spot and the orientation of the aruco marker or the QR-code is to be determined. Both the aruco marker and QR-code comprises a pattern by means of which the marker or the code may be identified.

According to an embodiment the tag 21 may be a combination of tags of different shapes, such as triangle, square, diamond-shaped or a line-segment of two tags directed into different directions, etc. The different shapes may be used to identify the specific tag, and thereby the specific spot in the excavator 1.

Different tags may be identified automatically by the stereo camera arrangement 22. The automatic identification may for example be based on the different shapes of the tags, the different QR-codes or aruco markers and the different glittering frequencies of the tags being provided by light sources, as disclosed above. The identification of the tags may thus be based on the individual properties of the tags.

Different tags may also be identified automatically on the basis of the positions of the tags relative to each other and/or relative to the specific camera 23 in the stereo camera arrangement 22.

Different tags may also be identified by the stereo camera arrangement 22 in response to the manual pointing or teaching of the specific tags to be monitored in each case to the stereo camera arrangement 22.

The at least one tag may also be replaced with at least one prism if the tachymeter is used as the locator.

The method for measuring a three dimensional location and orientation of the center axis of a first axle in relation to the center axis of a second axle comprises attaching at least one first spot to be located by at least one locator and to be rotatable around the first axle; attaching at least one second spot to be located by at least one locator and to be rotatable around the second axle; measuring by the at least one locator a first set of at least three different position data measurements of each of the at least one first spot, the different position data measurements taken in different rotation angles around the first axle; measuring by the at least one locator a second set of at least three different position data measurements of each of the at least one second spot, the different position data measurements taken in different rotation angles around the second axle; and determining, based on the first set of at least three different position data measurements and the second set of at least three different position data measurement, the three dimensional location and orientation of the center axis of the first axle in relation to the center axis of the second axle.

According to an embodiment the three dimensional location and orientation of the centre axis of the first axle, i.e. the rotation axis 4 of the rotation axle 3 of the upper carriage 2*b*, with respect to the centre axis of the second axle, i.e. the rotation axis 9 of the boom pin 8, may be determined with the following procedure, referring especially to FIGS. 5*a* to 5*c* but also to FIGS. 1, 2, 3*a* to 3*c* and 4. The procedure utilizes vector analysis and is carried out by the processing or calculation unit, such as the control unit 14.

Firstly, referring to FIG. 5*a*, the processing unit is configured to define a first plane P1 based on each different position measurements in the first set of position data measurements. The first set of the position data measurements of FIG. 5*a* comprises three position data measurements M11, M12, M13 of the first spot, i.e. a specific point in the upper carriage 2*b*, such as the head of the antenna 16, each position data measurement M11, M12, M13 being carried out at different angle of the rotation of the upper carriage 2*b* about the rotation axis 4 of the rotation axle 3 as shown schematically in FIGS. 3*a* to 3*c*. The position data measurements M11, M12, M13 may be carried out by the positioning arrangement of FIG. 4 including the stereo camera arrangement 22 shown schematically in FIG. 2. The first plane P1 is a plane which is determined by the first set of the position data measurements M11, M12, M13 forming three vectors between the position data measurements M11, M12 and M13, rendering vectors M11 to M12, M12 to M13 and M13 to M11, for example. These vectors define plane P1. Referring to the machine coordinate system denoted in FIGS. 3*a* to 3*c* the first plane P1 is a plane that is perpendicular to the z-axis if the upper carriage 2*b* does not wobble during the position data measurements. If the upper carriage 2*b* wobbles during at least one position data measurement, the first plane determined will not be exactly perpendicular to the z-axis. Wobbling may be prevented by setting the boom arrangement in time of the first set of the position data measurement into such a position that the center of gravity of the upper carriage 2b taking into account the boom arrangement as well is not too close to the assumed centre axis of the first axle. Further, it is possible to exclude possible incorrect measurements by taking substantially more than three position data measurements. The first set as well as the second set of position data measurements may contain tens, hundreds or even thousands of position data measurements, wherefrom incorrect measurements may be excluded by using, for example, statistics.

Secondly, further referring to FIG. 5a, the processing unit is configured to define a second plane P2' based on each different position measurements in the second set of position data measurements. The second set of the position data measurements of FIG. 5a comprises three position data measurements M21, M22, M23 of one second spot, i.e. a specific point in the boom 5, such as the tag 21 in the first boom part 5a, each position data measurement M21, M22, M23 being carried out at different angle of the rotation of the boom 5 about the rotation axis 9 of the boom pin 8 as shown schematically in FIG. 1. The position data measurements M21, M22, M23 may be carried out by the positioning arrangement of FIG. 4 including the stereo camera arrangement 22 shown schematically in FIG. 2. The second plane P2' is a plane which is determined by the second set of the position data measurements M21, M22, M23 forming three vectors between the position data measurements M21, M22 and M23, rendering vectors M21 to M22, M22 to M23 and M23 to M21, for example. These vectors define plane P2' that is perpendicular to the centre axis of the second axle, i.e. the boom pin 8. The plane P2' is a plane that is selected to be parallel to the y-axis but not necessarily perpendicular to the x-axis if the orientation of the boom pin 8 is not exactly parallel to the x-axis in the machine coordinate system of FIGS. 3a to 3c.

Thirdly, referring now to FIG. 5b, the processing unit is configured to define a third plane P3 that is perpendicular to the first plane P1 and the y-axis. Thus, the direction perpendicular to the y-axis is the direction of the third plane P3 in the machine coordinate system denoted in FIGS. 3a to 3c. The third plane P3 is shown schematically in FIG. 5b. Referring to the machine coordinate system denoted in FIGS. 3a to 3c the third plane P3 is a plane that is parallel to the x-axis and the z-axis in the coordinate system of FIGS. 3a to 3c. Finally the processing unit is configured to define a second plane P2 that is perpendicular to the first plane P1 and the third plane P3.

After determining the first, second and third planes P1, P2, P3 the processing unit is configured to determine the first axis, wherein the first axis is perpendicular to the first plane P1 and intersects the first plane P1 at a first intersection point, the first intersection point being a center of rotation defined from the first set of the position data measurements M11, M12, M13. The first axis is thus the centre of rotation of the rotating axle 3 of the upper carriage 2b, i.e. the rotation axis 4 of the upper carriage 2b, and is intended to correspond to the z-axis in the machine coordinate system of FIGS. 3a to 3c. The first axis may thus be denoted to correspond to the z-axis of the machine coordinate system of FIGS. 3a to 3c, and therefore the point of the intersection of the first axis and the first plane P1 is denoted in FIG. 5b with a reference sign z. This, in turn, referring to the previous paragraph, renders the x-axis to be perpendicular to the y- and z-axis because plane P3 is perpendicular to the first plane P1 and the second plane P2.

Figure 3A:
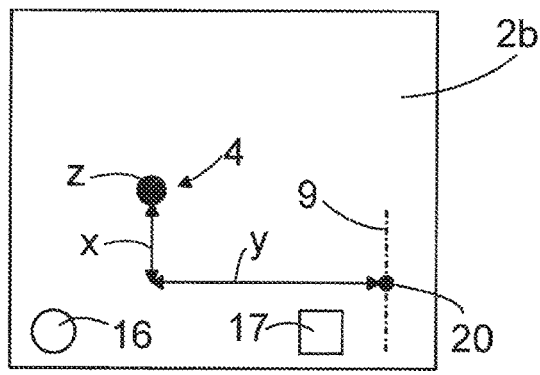
FIGS. 3a, 3b, 3c show schematically from above an upper carriage of the excavator of FIG. 1 and an exemplary coordinate axis defined relative to a rotation axis of the upper carriage at three different angles of rotation of the upper carriage. In the exemplary coordinate axis, inspected from above view, x-axis has been selected substantially parallel to the lifting axis or the centre axis of the boom pin and z-axis has been selected to coincide to the rotating axis of the upper carriage.
Figure 3B:
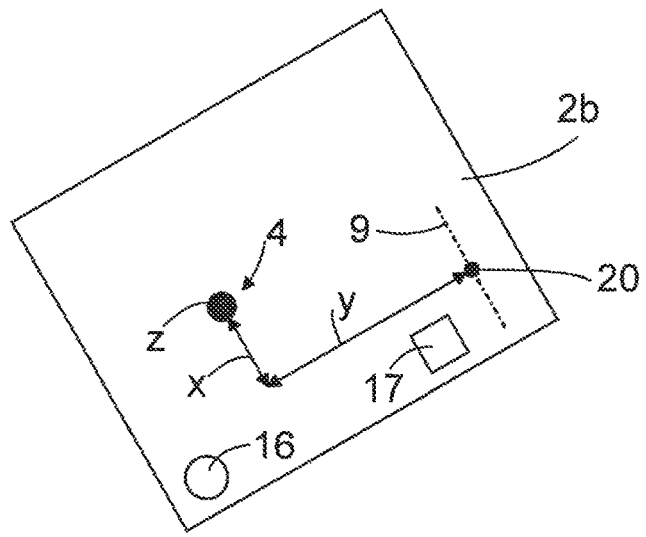
Figure 3C:
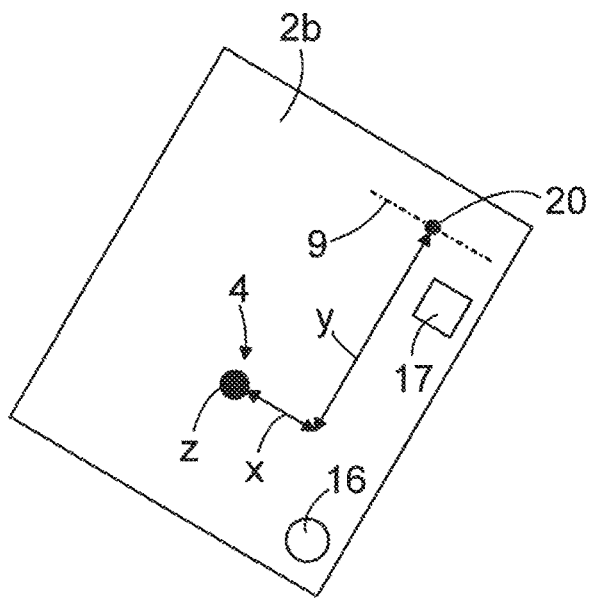

After determining the first axis, i.e. the z-axis, the processing unit is configured to determine the second axis, wherein the second axis is perpendicular to the plane P2' and intersects the plane P2' at a second intersection point, the second intersection point being a center of rotation defined from the second set of the position data measurements M21, M22, M23. The second axis is thus the center of rotation of the boom pin 8 of the boom 5, i.e. the rotation axis 9 of the boom 5, and because the second axis was provided by the rotation axis 9 of the boom 5 when the second set of the position data measurements M21, M22, M23 were gathered, the second axis is exactly perpendicular to the plane P2'. The second axis thus provides an axis that is parallel to the x-axis of the machine coordinate system viewed from above, as shown in FIGS. 3a to 3c and thereby the second axis may be equated with the x-axis of the machine coordinate system of FIGS. 3a to 3c. The point of the intersection of the second axis and the plane P2' is therefore denoted in FIG. 5b with a reference sign x. The second axis is selected to be parallel to the third plane P3 that, in turn, was selected to be perpendicular to the first plane P1 which renders the second plane P2 perpendicular to the first plane P1 and third plane P3, whereby it follows that the x-axis is perpendicular to the z-y-plane.

Thereafter the processing unit determines the orientation angle between the first axle and the second axle on the third plane P3, the orientation angle being defined as the angle between perpendicular projections of the first axis and the second axis on the third plane P3, the orientation angle in excavator 1 being close to 90 degrees. The principle of the projections x', z' of these first axle, or the z-axis, and the second axle on the third plane P3 are shown very schematically in FIG. 5b. The angle may be determined by using vector calculations that are common mathematical procedures that are out of the scope of the invention, thus, not disclosed in detail.

Thereafter the processing unit is configured to determine the shortest distance between the plane P3' and the lifting axis 9 by calculating the shortest distance from the second intersection point x to the plane P3', where the plane P3' is a plane parallel to the third plane P3 and being set to the level where it contains the first axle as a subset, as shown schematically in FIG. 5c. In other words, referring to FIG. 5c, at this step the third plane P3 is to be projected to run through the z-axis, whereby the shortest distance between the plane P3' and the lifting axis 9 is the distance in y-axis direction from the second intersection point x to the plane P3' projected to run through the z-axis. The projected third plane is thus denoted with reference sign P3' in FIG. 5c. The shortest distance between the plane P3' and the center of rotation of the second axle is denoted schematically in FIG. 5c with the reference sign D.

The calculation procedure disclosed above thus determines the location and orientation of the lifting axis 9 containing the center of rotation of the boom pin 8 as a subset and thereby the location and orientation of the rotation axis 9 of the boom 5 in respect of the rotation axis 4 of the center of rotation of the rotation axle 3 of the upper carriage 2b.

According to an embodiment the at least one first spot is the same as the at least one second spot. This means that at least one specific point originally selected to be the second spot and residing in the boom 5 may also be determined to be at least one first spot. According to this embodiment the excavator 1 may for example comprise at least two antennas 16 or tags 21 in the upper carriage 2b and at least one antenna 16 or tag 21 in the boom 5, whereby all those devices may be utilized in the measuring of the first set of the at least three different position data measurements M11, M12, M13, whereby also possible inclination of the excavator 1 may be recognized and determined. In this embodiment, one should be careful when taking the antenna 16 or tag 21 in the boom 5 into the group of first spots, since the boom 5 should in that case not move in relation to the upper carriage 2b in between the at least three different position data measurements M11, M12, M13.

According to an embodiment the positioning arrangement comprises at least two first spots to be located, wherein at least one of the at least two first spots reside in essentially different radius from an estimated location of the first axle than at least one other of the at least two first spots. According to this embodiment the inclination angle of the earthworks machine may be determined by using elements identifying in the earthworks machine specific points at different radial distances from a rotation centre of the first axle. According to this embodiment there may thus be at least two antennas 16 and/or tags 21 or some other elements identifying a specific point in the machine at different radial distances from the rotation axis 4 of the rotation axle 3 of the upper carriage 2b, whereby possible inclination of the excavator 1 may be recognized and determined, for example, on the basis of the location of the vertical projection of the respective spot on the rotation axis 4 of the rotation axle 3 of the upper carriage 2b, i.e. on the z-axis in the coordinate system shown in FIGS. 3a to 3c.

According to an embodiment the positioning arrangement comprises at least two second spots to be located, wherein at least one of the at least two second spots reside in essentially different radius from an estimated location of the second axle than at least one other of the at least two second spots. According to this embodiment the inclination angle changes, i.e. wobbling, of the earthworks machine may be determined between the position data measurements by using elements identifying in the earthworks machine specific points at different radial distances from a rotation centre of the second axle. According to this embodiment, there may for example be in the upper carriage 2b at least two antennas 16 and/or tags 21 or some other elements identifying specific point in the machine at different radial distances from the rotation axis 9 of the boom 5. Additionally the at least two antennas 16 and/or tags 21 or some other corresponding elements may also be on different elevation planes relative to each other. Then there may be determined a line segment between the at least two antennas 16 and/or tags 21 or some other corresponding elements, and a possible inclination angle changes, i.e. wobbling, of the excavator 1 may be recognized and determined between the position data measurements on the basis of the location of an end of the normal of that line segment at the rotation axis 4 of the rotation axle 3 of the upper carriage 2b, i.e. on the z-axis in the coordinate system shown in FIGS. 3a to 3c.

According to an embodiment the position data gathering unit is further configured to gather inclination data regarding each of the position data measurements and the processing unit is further configured to receive as an input the inclination angle data regarding each of the position data measurements. According to this embodiment the position data gathering unit may comprise specific inclination sensors arranged for example at the upper carriage 2b of the excavator 1, and the position data gathering unit is connected to the processing unit, such as the control unit 14, to supply as the input the inclination angle data as regards to each of the position data measurements M11, M12, M13, M21, M22, M23 to. In other words, the inclination data of the excavator 1 may be determined by the inclination sensors for each position data measurement M11, M12, M13, M21, M22, M23 at exactly the same time as the actual position data measurements M11, M12, M13, M21, M22, M23 occur.

According to an embodiment the first axle is a rotation axle 3 of a rotating upper carriage 2b of an earthworks machine and the second axle is a boom pin 8 of the earthworks machine wherein the boom pin 8 is the pin attaching the boom 5 to the rotating upper carriage 2b.

According to an embodiment at least one first spot is an attachment point for an antenna 16 of any positioning system. Referring for example to the example of FIGS. 1 and 2, the attachment point of the antenna 16, or the head of the antenna 16 as disclosed above, may provide the first spot the position of which is to be measured when the at least one of the first set M11, M12, M13 and/or the second set M21, M22, M23 of position data measurements are carried out. Some positioning systems was already listed above.

According to an embodiment of the measuring arrangement, the at least one first spot to be located resides in the rotating upper carriage 2b and the at least one second spot to be located resides in the boom and the positioning arrangement further includes at least three fourth spots in the lower carriage 2a of the earthworks machine. The at least three fourth spots in the lower carriage 2a may be set randomly to the lower carriage 2a, although the at least three fourth spots may not be set to lie on one line. By using the at least three fourth spots it may be provided a coordinate system 19 shown schematically in the lower carriage 2a in FIG. 1, relative to which coordinate system 19 the location of the at least one first spot in the upper carriage 2b and/or the location of the at least one second spot in the boom 5 may be determined. The at least three fourth spots may be for example tags 21 to be located by at least one stereo camera arrangement 22. Furthermore, according to this embodiment the position data gathering unit is further configured to gather, in the first set of at least three different position data measurements M11, M12, M13 of each of the at least one first spots to be located, the position data measurements of the at least three fourths spots in respective different rotation angles as the at least one first spot. Therefore, in time of each of the measurement data of the first set of at least three different position data measurements M11, M12, M13 of each of the at least one first spot to be located, also is measured the position data measurement of the at least three fourth spots as a reference measurement data M41, M42, M43 to compensate possible wobbling of the upper carriage 2b in relation to the lower carriage 2a and/or possible movement of the lower carriage 2a in relation the ground between each of the at least three different position data measurements M11, M12, M13. Further, according to this embodiment the processing unit is further configured to receive as an input the position data measurements M41, M42, M43 of the at least three fourth spots in respective different rotation angles as the position data measurements M11, M12, M13 of the at least one first spot. With this embodiment it may be determined the inclination angle change, i.e. wobbling, or any other undesired movement of the upper carriage 2b in relation to the lower carriage 2a in between of the at least three different positions of the upper carriage 2b, i.e. at each respective different rotation angles of the upper carriage 2b at exactly the same time when the first set of at least three different position data measurements are carried out.

According to an embodiment of the measuring arrangement the at least one second spot to be located resides in the boom and the rotating upper carriage comprises at least three third spots, wherein the position data gathering unit is further configured to gather, in the second set of at least three different position data measurements M21, M22, M23 of each of the at least one second spot to be located, the position data measurements of the at least three third spots in respective different rotation angles as the position data measurements of the at least one second spots. The at least three third spots in the upper carriage 2b may be set randomly to the upper carriage 2b, although the at least three third spots may not be set to lie on one line. Alternatively, at least one of the at least three third spots may be the same as the at least one first spot. By using the at least three third spots it may be provided a coordinate system 18 shown schematically in the upper carriage 2b in FIG. 1, relative to which coordinate system 18 the location of the at least one second spot in the boom 5 may be determined. The at least three third spots may for example be tags 21 to be located by at least one stereo camera arrangement 22. Therefore, in time of each of the measurement data of the second set of at least three different position data measurements M21, M22, M23 of each of the at least one second spot to be located, also measured is the position data measurement of the at least three third spots as a reference measurement data M31, M32, M33 to compensate possible wobbling or any other undesired movement of the upper carriage 2b in relation to the lower carriage 2a or the ground between each of the at least three different position data measurements M21, M22, M23. Two rotation angles of the boom 5 are shown schematically in FIG. 1. The processing unit is further configured to receive as an input the position data measurements of the at least three third spots in respective different rotation angles as the position data measurements of the at least one second spot. With this embodiment it may be determined the inclination angle changes, i.e. wobbling, or any other undesired movement of the upper carriage 2b in relation to the lower carriage 2a or the ground between each of the at least three different positions of the boom 5, i.e. at each respective different rotation angles of the boom 5 at exactly the same time when the second set of at least three different position data measurements are carried out.

According to an embodiment, in time of each of the measurement data of the first set of position data measurements M11, M12, M13 of each of the at least one first spot to be located and/or in time of each of the measurement data of the second set of position data measurements M21, M22, M23 of each of the at least one second spot to be located, also measured is the position data measurement of both of the at least three third spots as a reference measurement data M31, M32, M33 and the at least three fourth spots as a reference measurement data M41, M42, M43 to compensate possible wobbling or any other undesired movement of the boom 5 in relation to the upper carriage 2b and/or the lower carriage 2a and/or the ground and/or to compensate possible wobbling or any other undesired movement of the upper carriage 2b in relation to the lower carriage 2a and/or the ground.

According to an embodiment of the measuring arrangement at least one of the at least one first spot and at least one third spot is an attachment point for an antenna 16 of any positioning system.

According to an embodiment the measuring arrangement is further configured to determine at least one 3D-point of the earthworks machine in three dimensions with respect to a determined point in the second axle, and the position data gathering unit is further configured to gather a third set of at least one position data measurement of the at least one 3D-point to be located with respect to at least one of the at least one set of the position data measurements and the information rendered from the at least one set of the position data measurements. In this embodiment the determined point in the second axle may for example be an axial centre point of the boom pin 8. The determined point in the second axle may also be used to determine the distance of, for example, the axial centre point of the boom pin 8 from the second plane P2 when the second plane P2 is being set to the level where it contains the first axle, or the z-axis, as a subset. Each one of the sets of the position data measurements define a three dimensional space as well as a point in the three dimensional space. Therefore, the determined 3D-point to be located may be located by using any one of the sets of the position data measurements or the data rendered therefrom. Neither the stereo camera arrangement 22 nor the earthworks machine may not change the place in between the third set of at least one position data measurement and the measurement with which the location of the 3D-point is to be determined, if the reference measurement data M31, M32, M33 regarding the at least three third spots is not available.

According to an embodiment of the measuring arrangement the at least one 3D-point determined is an attachment point for an antenna 16 of any positioning system or an attachment point for a positioning apparatus residing on a machine, such as stereo camera arrangement or a total station or the like. Thus, in this embodiment, the three dimensional position of, for example, an antenna to be attached to the excavator 1, may be determined in relation to the axial centre point of the boom pin 8, for example. Respectively, any point in the excavator 1 in relation to any other point may be positioned in three dimensions with this arrangement taking into account that at least two cameras of the stereo camera arrangement are able to detect or see the point to be positioned.

According to an embodiment of the measuring arrangement the at least one first spot and the at least one second spot are tags 21 to be located by at least one stereo camera arrangement 22.

According to an embodiment of the measuring arrangement the at least one stereo camera arrangement 22 comprises at least two cameras 23 in locations known with respect to each other.

The excavator 1 is an example of a mobile earthworks machine in connection with which the measuring arrangement disclosed herein may be utilized. In addition to the excavators like that the measuring arrangement disclosed herein could also be utilized for example in mobile cranes comprising a carriage part arranged to rotate relative to the rest of the mobile crane, and wherein rotatable carriage part comprises a lifting boom that may be lifted and lowered relative to a boom pin that is arranged to connect the boom to the rotatable carriage part. In the mobile cranes like this the solution disclosed is also used to determine the location and orientation of the boom pin relative to the rotation axle of the rotatable carriage part, thus making it easier to determine the relation of two essential parts of the crane and improving the positioning accuracy of the hook of the crane, the hook providing a working tool of the crane. The measuring arrangement and procedure disclosed above would be substantially similar in the mobile cranes. Further, the measuring arrangement fits to any machine having at least two rotating axis the relation of which need to be determined in three dimensional space.

It will be obvious to a person skilled in the art that, as the technology advances, the inventive concept can be implemented in various ways. The invention and its embodiments are not limited to the examples described above but may vary within the scope of the claims.

What is claimed is:

1. A measuring arrangement for a work machine for measuring a three dimensional location and orientation of a center axis of a first axle of the work machine in relation to a center axis of a second axle of the work machine, wherein the measured location and orientation of the first axle in relation to the second axle define, at least in part, a relation of a location and orientation of a tool of the work machine to the work machine, wherein the measuring arrangement comprises:
   a positioning arrangement, the positioning arrangement comprising
      at least one first spot and at least one second spot, each of the at least one first spot and the at least one second spot comprising at least one of a tag, prism, antenna, item detectable by a locator,
      at least one locator to determine a three dimensional position of the at least one first spot and the at least one second spot, the at least one first spot to be located by the at least one locator and to be rotatable around the first axle, the at least one second spot to be located by the at least one locator and to be rotatable around the second axle, and
   a position data gathering device configured to gather
      a first set of at least three different three dimensional position data measurements of each of the at least one first spot to be located, the at least three different three dimensional position data measurements taken in different rotation angles around the first axle, and
      a second set of at least three different three dimensional position data measurements of each of the at least one second spot to be located, the at least three different three dimensional position data measurements taken in different rotation angles around the second axle; and
   a processing device configured to perform operations comprising
      receiving as an input the first set of at least three different three dimensional position data measurements and the second set of at least three different three dimensional position data measurements, and
      determining, based on the received input data, the three dimensional location and orientation of the center axis of the first axle with respect to the center axis of the second axle.

2. The measuring arrangement as claimed in claim 1, wherein
   the at least one first spot is the same as the at least one second spot.

3. The measuring arrangement as claimed in claim 1, wherein
   the positioning arrangement comprises at least two first spots to be located, wherein at least one of the at least two first spots reside in essentially different radius from an estimated location of the first axle than at least one other of the at least two first spots.

4. The measuring arrangement as claimed in claim 1, wherein
   the positioning arrangement comprises at least two second spots to be located, wherein at least one of the at least two second spots reside in essentially different radius from an estimated location of the second axle than at least one other of the at least two second spots.

5. The measuring arrangement as claimed in claim 3, wherein
   the position data gathering device is further configured to gather the inclination angle data regarding each of the position data measurements, and the processing device is further configured to receive as an input the inclination angle data regarding each of the position data measurements.

6. The measuring arrangement as claimed in claim 4, wherein
   the position data gathering device is further configured to gather the inclination angle data regarding each of the position data measurements, and the processing device is further configured to receive as an input the inclination angle data regarding each of the position data measurements.

7. The measuring arrangement as claimed in claim 1, wherein
   the first axle is a rotation axle of a rotating upper carriage of an earthworks machine and the second axle is a boom pin of the earthworks machine wherein the boom pin is the pin attaching a boom to the rotating upper carriage.

8. The measuring arrangement as claimed in claim 7, wherein
   the at least one first spot to be located resides in the rotating upper carriage and the at least one second spot to be located resides in the boom,
   the positioning arrangement further comprising at least three fourth spots in a lower carriage of the earthwork machine,
   wherein the position data gathering device is further configured to gather, in the first set of at least three different position data measurements of each of the at least one first spot to be located, the position data measurements of the at least three fourth spots in respective different rotation angles as the at least one first spot, and
   the processing device is further configured to receive as an input the position data measurements of the at least three fourth spots in respective different rotation angles as the position data measurements of the at least one first spot.

9. The measuring arrangement as claimed in claim 8, wherein
   the at least three fourth spots are at least one of: tags and prisms to be located by at least one of the at least one locator, wherein the at least one locator is at least one of: at least one tachymeter, at least one theodolite, at least one laser scanning device and at least one stereo camera arrangement.

10. The measuring arrangement as claimed in claim 7, wherein
    the at least one second spot to be located resides in the boom and the rotating upper carriage comprises at least three third spots, and wherein
    the position data gathering device is further configured to gather, in the second set of at least three different position data measurements of each of the at least one second spot to be located, the position data measurements of the at least three third spots in respective different rotation angles as the position data measurements of the at least one second spot, and
    the processing device is further configured to receive as an input the position data measurements of the at least three third spots in respective different rotation angles as the position data measurements of the at least one second spot.

11. The measuring arrangement as claimed in claim 10, wherein
at least one of at least one first spot and at least one third spot is an attachment point for an antenna of any positioning system.

12. The measuring arrangement as claimed in claim 10, wherein
the at least three third spots are at least one of: tags and prisms to be located by at least one of the at least one locator, wherein the at least one locator is at least one of: at least one tachymeter, at least one theodolite, at least one laser scanning device and at least one stereo camera arrangement.

13. The measuring arrangement as claimed in claim 7, wherein
the measuring arrangement is further configured to determine at least one 3D-point of the earthworks machine in three dimensions with respect to a determined point in the second axle, wherein
the position data gathering device is further configured to gather a third set of at least one position data measurement of at least one 3D-point to be located with respect to at least one of at least one set of the position data measurements and the information rendered from the at least one set of the position data measurements.

14. The measuring arrangement as claimed in claim 13, wherein
the at least one 3D-point is an attachment point for at least one of: an antenna of any positioning system and a positioning apparatus for the earthworks machine.

15. The measuring arrangement as claimed in claim 13, wherein when selecting the at least one 3D-point to be an axial centre point of a boom pin of an earthworks machine, the location of the axial centre point of the boom pin may be determined in the x-y-plane in coordinate system where the rotating axis of the upper carriage is selected as a z-axis and the y-axis is selected to be perpendicular to both the z-axis and the boom pin and the x-axis is selected to be perpendicular to the z-axis and the y-axis.

16. The measuring arrangement as claimed in claim 1, wherein
at least one first spot is an attachment point for an antenna of any positioning system.

17. A measuring arrangement as claimed in claim 1, wherein the at least one locator is at least one of: at least one stereo camera arrangement, at least one tachymeter, at least one theodolite, at least one laser scanning device, a satellite-based positioning system GNSS and any network where location based services using triangulation is possible.

18. The measuring arrangement as claimed in claim 17, wherein
at least one of the at least one stereo camera arrangement comprises at least two cameras in locations and orientations known with respect to each other.

19. The measuring arrangement as claimed in claim 17, wherein
at least one of the at least one stereo camera arrangement is a standalone stereo camera arrangement comprising two cameras in locations and orientations known with respect to each other.

20. A method for a work machine for measuring a three dimensional location and orientation of a center axis of a first axle of the work machine in relation to a center axis of a second axle of the work machine, wherein the measured location and orientation of the first axle in relation to the second axle define, at least in part, a relation of a location and orientation of a tool of the work machine to the work machine, the method comprising:
attaching at least one first spot to be located by at least one locator and to be rotatable around the first axle;
attaching at least one second spot to be located by at least one locator and to be rotatable around the second axle;
measuring by the at least one locator a first set of at least three different three dimensional position data measurements of each of the at least one first spot, the at least three different three dimensional position data measurements taken in different rotation angles around the first axle;
measuring by the at least one locator a second set of at least three different three dimensional position data measurements of each of the at least one second spot, the at least three different three dimensional position data measurements taken in different rotation angles around the second axle; and
determining, based on the first set of at least three different three dimensional position data measurements and the second set of at least three different three dimensional position data measurement, the three dimensional location and orientation of the center axis of the first axle in relation to the center axis of the second axle.

* * * * *